May 19, 1925.                                                   1,538,507
J. BAEUMLE
LIFTER
Filed Dec. 18, 1924
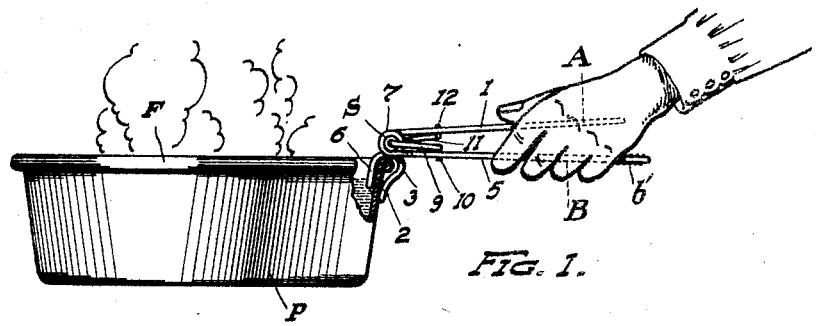
FIG. 1.
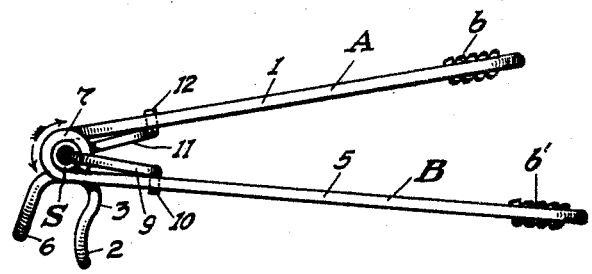
FIG. 2.
FIG. 3.
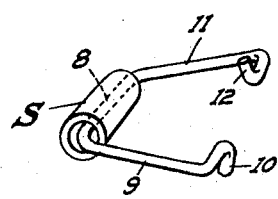
FIG. 4.
FIG. 5.
FIG. 6.
WITNESS:
Arne Gilbertson
INVENTOR:
John Baeumle.
BY:
Phil J. Nawn
ATTORNEY.

Patented May 19, 1925.

1,538,507

UNITED STATES PATENT OFFICE.

JOHN BAEUMLE, OF MILWAUKEE, WISCONSIN.

LIFTER.

Application filed December 18, 1924. Serial No. 756,714.

*To all whom it may concern:*

Be it known that I, JOHN BAEUMLE, a citizen of the United States, residing at Milwaukee, in the county of Milwaukee and State of Wisconsin, have invented certain new and useful Improvements in Lifters, of which the following is a specification.

This invention relates to improvements in kitchen utensils and has for its objects, the providing of a household tool that is light, durable and readily cleaned; to provide a bent wire design, whose loops are fashioned, so that, the gripping exerted in use tends to wind up, or tighten the coiled features; to provide normally open handle portions, terminating in a manner that will offer a positive gripping surface thereby insuring against any slipping action when lifting heated objects; also, providing a product of manufacture with a common and similar material for three of its four elements.

Other objects will be noted in the detailed description and appended claims, which refer to the drawing that forms part of this application, in which:—

Figure 1 is a view showing the application of this invention; Fig. 2 is a side view; Fig. 3, a plan of Fig. 2; Fig. 4, a detached view of the pintle and resilient means; Fig. 5, a diagram of the upper handle, and Fig. 6, a similar diagram of the lower handle.

Similar characters of reference apply to like parts throughout the several views.

Figure 1 illustrates an object, or pan T, being lifted with the invention here considered, the said pan having a customary brim that form a rounded flange F, common to cooking, or, household appliances. An upper handle A, is formed from a wire 1, the said wire is bent to provide a bight, or jaw 2, above which is formed an offset bend 3, from the said bend the wire 1 is wound to offer opposed and outwardly coiled helical loops 4, 4, the wire following the course indicated by the feathered arrow in Fig. 2 and diagrammatically shown in Fig. 5; beyond the said loops 4, 4, the wire 1 has its remaining ends disposed in parallel relationship to form extended handle A and terminates in a splice A, shown dotted to a handle B, as in Fig. 3, for clearness sake, said splice being turned in between the extended portions to offer an enlargement $b$, completing the upper handle and inner jaw of the lifter. A wire length 5 is similarly fashioned to provide the bight, or jaw 6, which is disposed below and extensive from its loops 7, 7, the said loops being wound in the direction of the plain arrow and disposed to register with the loops 4, 4 which lie within the aforesaid loops 7, 7; the remainder of the wire 5 is formed as before described to provide the enlarged splice $b'$ completing the lower handle element B. The handle A is intentionally shorter than the handle B in order to allow both handles to closely approach each other, in which position they will present the centrally disposed splices $b$ and $b'$ as gripping surfaces which will obviate the tendency to twist in the hand if no positive means were here provided. Through the registering loops 4, 4 and 7, 7, of the assembling handles, is passed a tubular pintle S, which serves as a pivoting hinge for the said handles, the pintle is maintained in its position by flaring the ends outwardly as at $x$, $x$, shown in Fig. 3.

A resilient, or, spring element is provided for keeping the members A and B normally open; this element is fashioned from a wire 8 that is bent to provide the arm 9 terminating in the downwardly projecting toe 10; the straight portion of the wire 8 is passed through the tubular pintle S and a similar arm 11 having an upwardly projecting toe 12 is formed; the arms 9 and 11 are disposed at an angle that is, respectively, below and above the horizontal, which, by virtue of the straight portion being anchored in the pintle S, provides the resilient means before referred to, which engages one side of the handle B with the toe 10 and the opposite side of the handle A with the toe 12, the complete aspect of the spring element being shown in Fig. 4.

The method here employd, in winding the wires 1 and 5, prevents the tool from becoming weaker with continued use, as the pressure exerted in gripping tends to wind up the coils 4, 4 and 7, 7, a provision which allows usage to assist against deterioration. The jaws 2 and 6, with the offset 3, will permit this device to grip any design of cooking utensil irrespective of its flanged or plain brim.

The above described invention offers a simple problem in the manufacturing of lifting tools, and by virtue of the adoption of a wire form of material employed here, allows of the forming of consecutive curves and coils, such as comprise the lifter here disclosed.

Having described the invention what is desired to claim, and protect by Letters Patent, is:—

1. A lifter of the kind described having, dual wire members opposedly wound to form registering loops, jaw portions beneath the said loops, handle elements, and tubular pivoting means joining the handle elements, said means within the loops aforesaid and between the jaw portions and the handle elements.

2. A lifter of the kind described having, wound wire members offering pivoting loops, a tubular pintle with outwardly flared ends, the said loops enveloping the said pintle between the ends aforesaid.

3. A lifter of the kind described having, wound wire elements forming upper and lower handles provided with aligned loops, a tubular pintle within the said loops, resilient means anchored in the said pintle, said means offering extended arms having opposed toes, one side of an upper handle engaged by an upstanding toe and the opposite side of a lower handle engaged by a depending toe.

4. In a lifter of the kind described, the combination of wound wire members offering a pair of pivoted handle portions provided with opposed jaws, aligned loops between the said handles and the said jaws, coupling means pivoting together the said members, resilient structure anchored in the said means, the said structure resisting compression of the handles aforesaid.

In testimony whereof I hereby affix my signature.

JOHN BAEUMLE.